(12) United States Patent
Campero et al.

(10) Patent No.: US 8,339,265 B2
(45) Date of Patent: Dec. 25, 2012

(54) METHOD OF ASSIGNING AND DEDUCING THE LOCATION OF ARTICLES DETECTED BY MULTIPLE RFID ANTENNAE

(75) Inventors: Richard J. Campero, San Clemente, CA (US); Donald G. Bauer, Laurel, MD (US); Paul B. Rasband, Frederick, MD (US); Richard H. Spedden, Clarksville, MD (US); Matthew A. Jones, Ladera Ranch, CA (US)

(73) Assignee: Sensormatic Electronics, LLC., Boca Raton, FL (US)

( * ) Notice: Subject to any disclaimer, the term of this patent is extended or adjusted under 35 U.S.C. 154(b) by 0 days.

(21) Appl. No.: 13/093,081

(22) Filed: Apr. 25, 2011

(65) Prior Publication Data

US 2011/0199211 A1 Aug. 18, 2011

Related U.S. Application Data

(63) Continuation of application No. 11/579,637, filed on Jun. 11, 2008, now Pat. No. 7,932,830.

(51) Int. Cl.
  *G08B 13/14* (2006.01)
(52) U.S. Cl. .................. 340/572.7; 340/10.1; 340/572.1
(58) Field of Classification Search ............... 340/572.7, 340/572.1, 10.1, 10.2, 572.4, 568.1, 539.1
  See application file for complete search history.

(56) References Cited

U.S. PATENT DOCUMENTS

| | | | |
|---|---|---|---|
| 5,686,902 A * | 11/1997 | Reis et al. ..................... | 340/10.2 |
| 5,887,176 A | 3/1999 | Griffith et al. | |
| 6,040,774 A * | 3/2000 | Schepps ..................... | 340/572.1 |
| 6,219,613 B1 | 4/2001 | Terrier et al. | |
| 6,331,972 B1 | 12/2001 | Harris et al. | |
| 6,353,406 B1 * | 3/2002 | Lanzl et al. .................. | 340/10.1 |
| 6,362,738 B1 * | 3/2002 | Vega .......................... | 340/572.1 |
| 6,563,417 B1 | 5/2003 | Shaw | |
| 6,650,228 B1 | 11/2003 | Vacherand et al. | |
| 6,917,290 B2 * | 7/2005 | Land .......................... | 340/539.1 |
| 7,218,641 B2 * | 5/2007 | Kuffner et al. ................ | 370/445 |
| 7,667,575 B2 * | 2/2010 | Husak et al. .................. | 340/10.2 |
| 7,932,830 B2 * | 4/2011 | Campero et al. ........... | 340/572.7 |

* cited by examiner

*Primary Examiner* — John A Tweel, Jr.
(74) *Attorney, Agent, or Firm* — Kacvinsky Daisak PLLC

(57) ABSTRACT

In accordance with preferred embodiments or the invention, a method (and corresponding apparatus) is provided for deducing the location of one or more items or objects to be monitored. In exemplary embodiments, the method (and corresponding apparatus) is implemented in RFID (radio frequency identification) applications (e.g., reading RFID tags at 13.56 MHz and approximately 900 MHz) by deducing the location of an item associated with a unique RFID tag in one or more areas of detection covered by multiple RFID reader antennae.

18 Claims, 11 Drawing Sheets

Front Elevation View

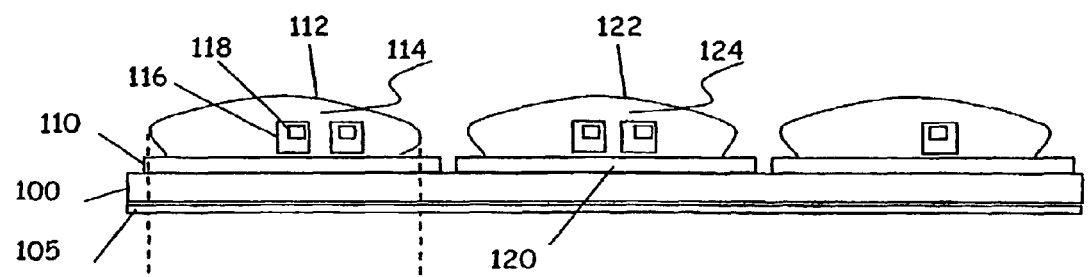
FIG. 1A Front Elevation View
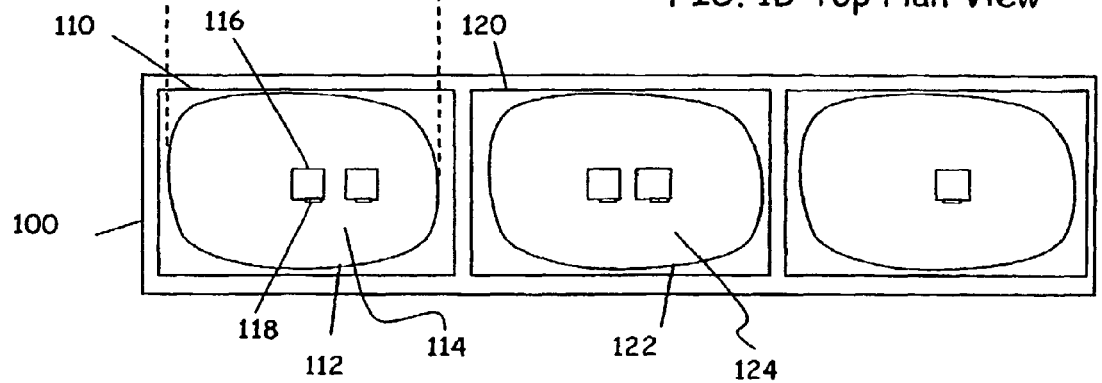
FIG. 1B Top Plan View

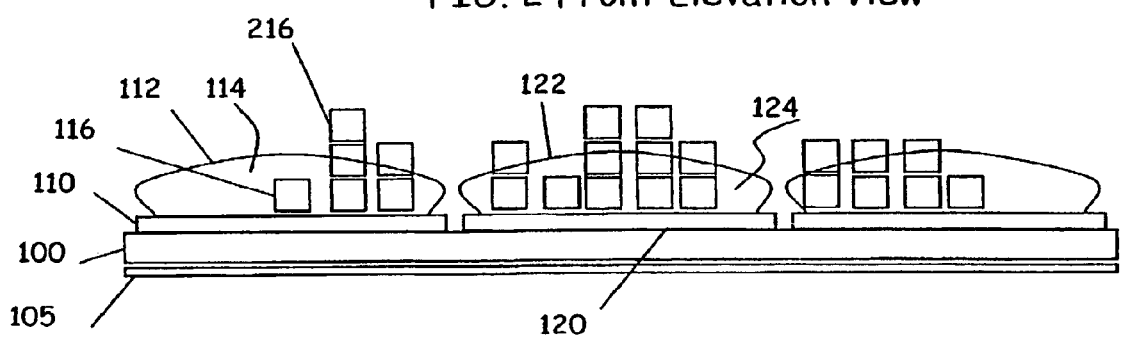
FIG. 2 Front Elevation View

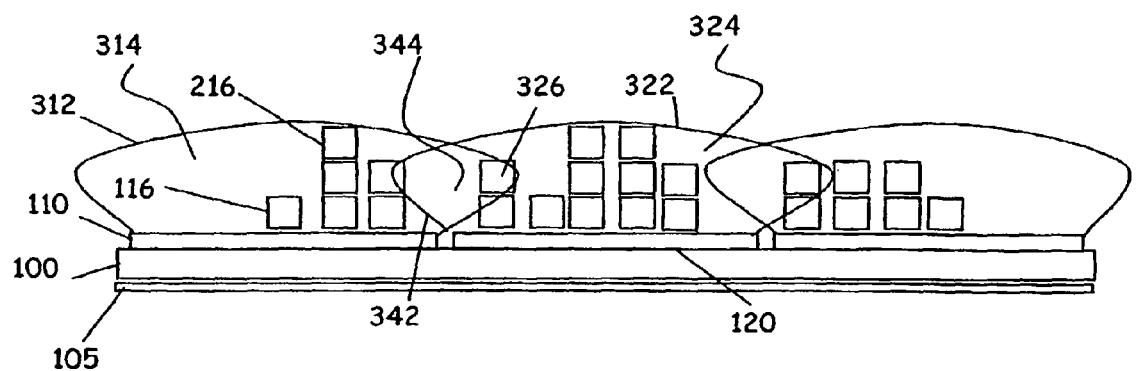
FIG. 3A Front Elevation View
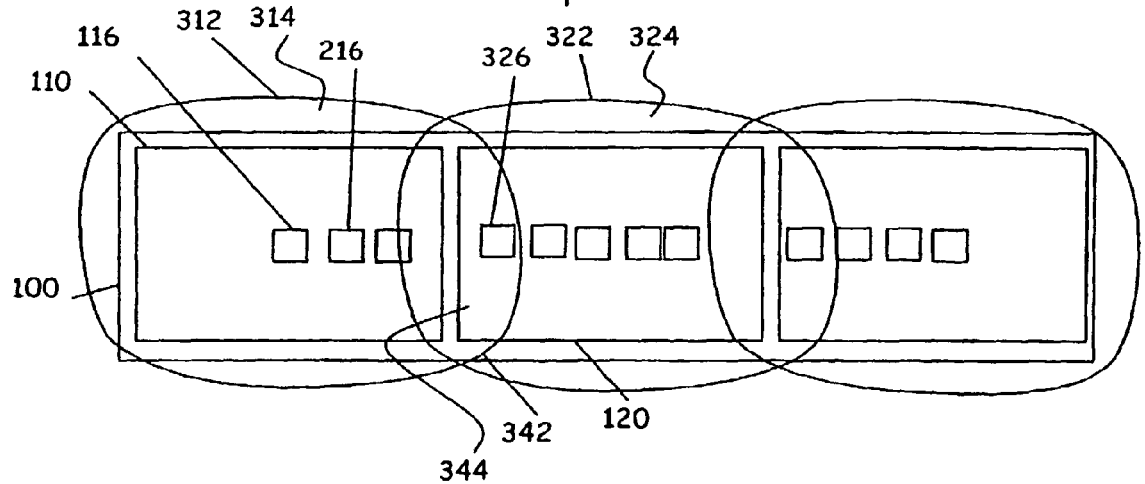
FIG. 3B Top Plan View

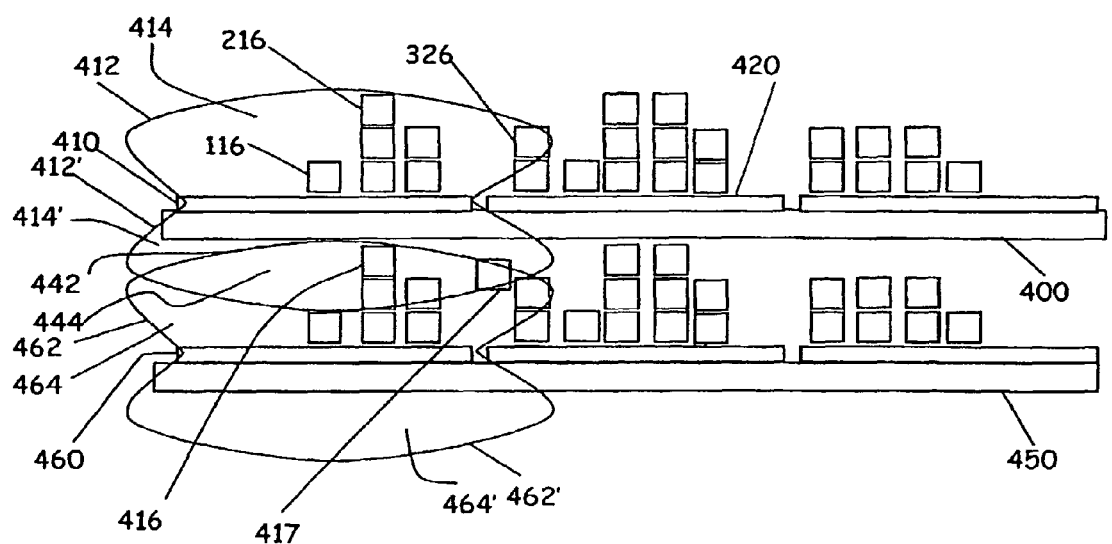
FIG. 4 Front Elevation View

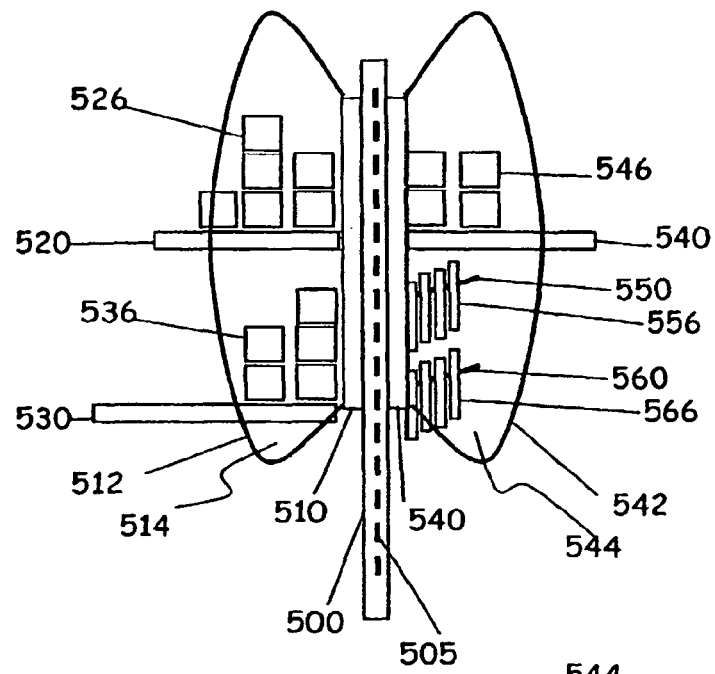
FIG. 5A Side Elevation View
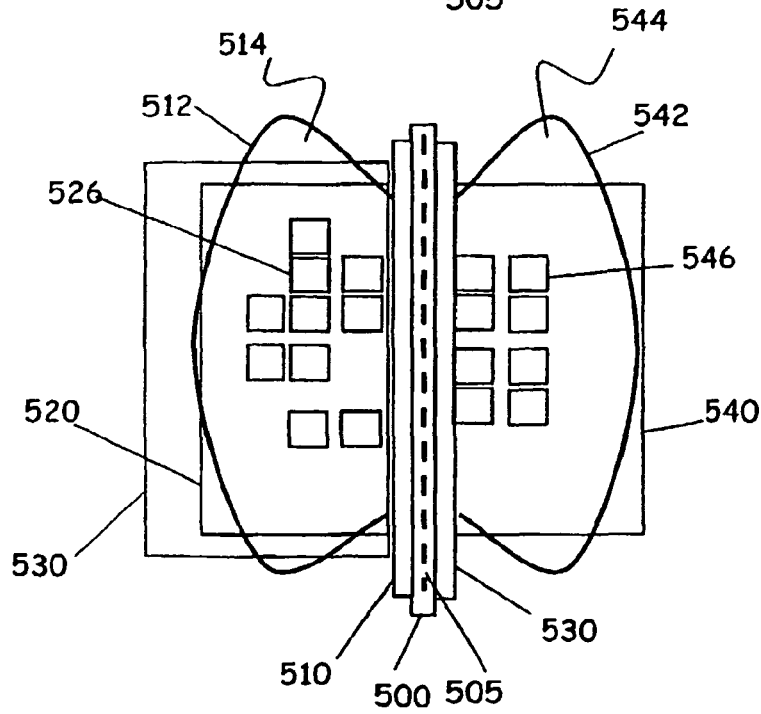
FIG. 5B
Top Plan View

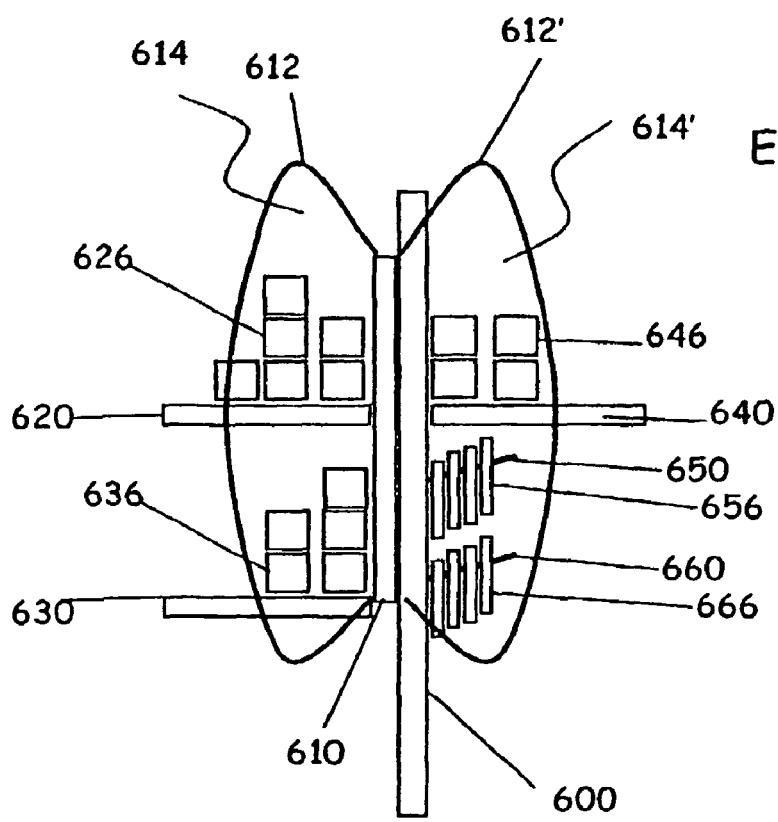
FIG. 6 Side Elevation View

US 8,339,265 B2

METHOD OF ASSIGNING AND DEDUCING THE LOCATION OF ARTICLES DETECTED BY MULTIPLE RFID ANTENNAE

This application is a continuation of, and claims priority to, U.S. application Ser. No. 11/579,637 ('637 application) filed on Jun. 11, 2008 titled "Method of Assigning and Deducing the Location of Articles Detected by Multiple RFID Antennae," which is incorporated herein by reference in its entirety. The '637 application claims the benefit of U.S. Provisional Patent Application No. 60/568,847 ('847 application), filed May 7, 2004, and is a continuation-in-part of U.S. patent application Ser. No. 10/338,892 ('892 application), filed Jan. 9, 2003, and U.S. patent application Ser. No. 10/348,941 ('941 application), filed Jan. 23, 2003, where the '892 application claims the benefit of U.S. Provisional Application Nos. 60/346,388 ('388 application), filed Jan. 9, 2002, and 60/350,023 ('023 application), filed Jan. 23, 2002, where the '941 application is a continuation-in-part of the '892 application and claims the benefit of the '023 application, and where this application is related to U.S. Provisional Application Nos. 60/469,024 ('024 application), filed May 9, 2003, 60/479,158 ('158 application), filed Jun. 18, 2003, 60/679,846 ('846 application), filed Jun. 20, 2003, and 60/489,934 ('934 application), filed Jul. 25, 2003. The disclosure of each of the '847, '892, '941, '388, '023, '721, '024, '158, '846, and '934 applications is expressly incorporated herein by reference in their respective entireties.

BACKGROUND

Radio frequency identification (RFID) systems typically use one or more RFID reader antennae to send radio frequency (RF) signals to items tagged with RFID tags. The use of such RFID tags to identify an item or person is well known in the art. In response to the RF signals from a RFID reader antenna, the RFID tags, when excited, produce a disturbance in the magnetic field (or electric field) that is detected by the RFID reader antenna. Typically, such tags are passive tags that are excited or resonate in response to the RF signal from a RFID reader antenna when the tags are within the detection range of the RFID reader antenna.

The detection range of the RFID systems is typically limited by signal strength to short ranges (or detection zones), for example, frequently less than about one foot for 13.56 MHz systems. Therefore, portable reader units may be moved past a group of tagged items in order to detect all the tagged items, particularly where the tagged items are stored in a space significantly greater than the detection range of a stationary or fixed single RFID reader antenna. Alternately, a large RFID reader antenna with sufficient power and range to detect a larger number of tagged items may be used. However, such an antenna may be unwieldy and may increase the range of the radiated power beyond allowable limits. Furthermore, these RFID reader antennae are often located in stores or other locations where space is at a premium and it is expensive and inconvenient to use such large RFID reader antennae. In another possible solution, multiple small antennae may be used, but such a configuration may be awkward to set up when space is at a premium and when wiring is preferred to be hidden.

Current RFID reader antennae are designed so that a sufficient read range may be maintained between the antenna and associated tags, without running afoul of FCC limitations on radiated emissions.

Resonant loop RFID reader antenna systems are currently utilized in RFID applications, where numerous RFID reader antennae are connected to a single reader. Each RFID reader antenna may have its own tuning circuit that is used to match to the system's characteristic impedance. A number of moderately sized antennae may be used, where the coverage of a given antenna may extend somewhat beyond that antenna's bounds, and may even overlap the coverage of one or more adjacent antennae, in order not to miss tags near the edges of an antenna or along boundaries between two antennae. If more than one antenna can read a given RFID tag, duplicate reads may arise for that tag. This may result in an uncertainty as to the location of the tagged item. It may also increase the data traffic due to duplicated or repeated transmissions of data for that tag.

SUMMARY

In accordance with preferred embodiments of the invention, a method (and corresponding apparatus) is provided for deducing the location of one or more items or objects to be monitored. In exemplary embodiments, the method (and corresponding apparatus) is implemented in RFID (radio frequency identification) applications (e.g., reading RFID tags at 13.56 MHz and approximately 900 MHz) by deducing the location of an item associated with a unique RFID tag in one or more areas of detection covered by detectors in the form of, for example, multiple RFID reader antennae.

BRIEF DESCRIPTION OF THE DRAWINGS

FIG. 1A illustrates a front elevation view of RFID reader antennae and items tagged with RFID tags in accordance with a preferred embodiment of the invention;

FIG. 1B illustrates a top plan view of RFID reader antennae and items tagged with RFID tags in accordance with a preferred embodiment of the invention;

FIG. 2 illustrates a front elevation view with some tagged items being outside the range of an RFID reader antenna in accordance with a preferred embodiment of the invention;

FIG. 3A illustrates a front elevation view of RFID reader antennae with increased read range to detect tags items that otherwise are outside the range of the RFID reader antennae in accordance with a preferred embodiment of the invention;

FIG. 3B illustrates a top plan view of RFID reader antennae with increased read range to detect tagged items that otherwise are outside the range of the RFID reader antennae in accordance with a preferred embodiment of the invention;

FIG. 4 illustrates a front elevation view showing RFID reader antennae on multiple vertical levels in accordance with a preferred embodiment of the invention;

FIG. 5A illustrates a side elevation view of RFID reader antennae placed in a "back-to-back" orientation in accordance with a preferred embodiment of the invention;

FIG. 5B illustrates a top plan view of RFID reader antennae placed in a "back-to-back" orientation in accordance with a preferred embodiment of the invention;

FIG. 6 illustrates a side elevation view of RFID reader antennae placed in a "back-to-back" orientation in accordance with a preferred embodiment of the invention;

DETAILED DESCRIPTION

Figure 7:
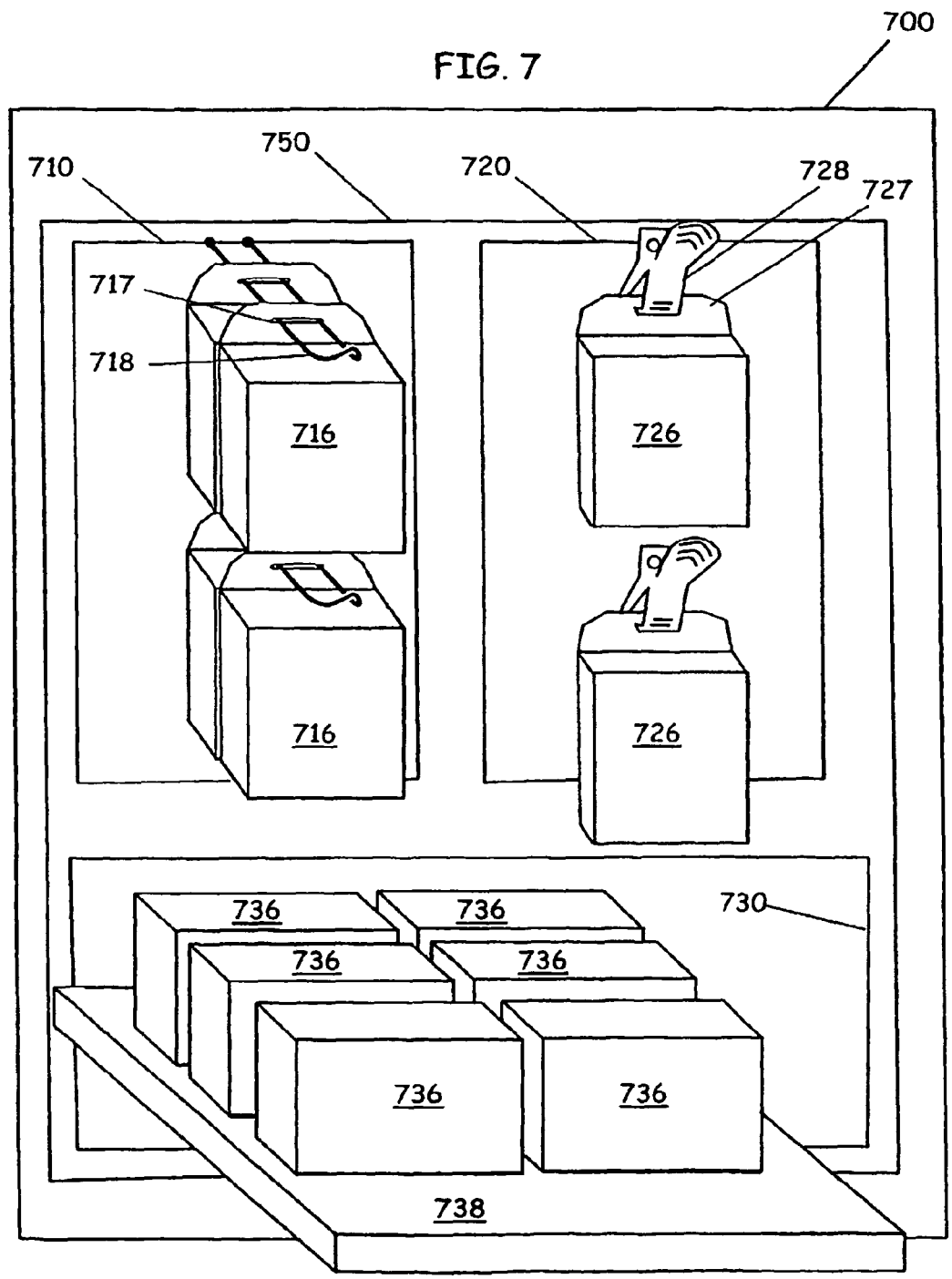
FIG. 7 illustrates tagged items supported upon several support structures within the field of RFID reader antennae in accordance with a preferred embodiment of the invention.

Preferred embodiments and applications of the invention will now be described. Other embodiments may be realized and changes may be made to the disclosed embodiments without departing from the spirit or scope of the invention. Although the preferred embodiments disclosed herein have been particularly described as applied to the field of RFID systems, it should be readily apparent that the invention may be embodied in any technology having the same or similar problems. Furthermore, while the examples herein are particularly described in relation to a shelf system, for example, in a facility such as a retail store, it should be readily apparent that the invention may be embodied in other form factors and in other facilities.

A system of detectors in the form of RFID reader antennae is used to keep track of inventory. Such a system is described in the previously referenced patent applications, which are all incorporated herein by reference in their entireties. In accordance with a preferred embodiment, a method of assigning the physical position of tagged items when they are detected by more than one RFID reader antenna is provided. The description herein can be applied to stationary or non-stationary items. Preferred systems are associated with a shelf system for supporting or storing items, but it should be understood that other structures could also be used in other systems for supporting or storing items.

Generally, increasing the RF (radio frequency) power to an RFID reader antenna will increase the range of the antenna. Increasing the range of an antenna may be desired to ensure reading, for example, items stacked high on a shelf, or on the next shelf up. Increased RF power per RFID reader antenna may require fewer antennae to read items over the same distance. However, as the RF power is increased, RF coverage may overlap between antennae so that some RFID tags may be read by more than one antenna.

As used herein, the term "actual read zone" refers to the volume or 3-dimensional space comprising the intended read range or the apparent physical storage area for items associated with a particular antenna. For example, if there are N RFID reader antenna, there would be N actual read zones. In a preferred embodiment, if the actual read zones of more than one RFID reader antenna overlap, each overlapping area or volume can be designated or assigned as a separate detection zone, termed a "virtual read zone" or "virtual zone." For N RFID antennae placed end-to-end, for example, on a shelf or shelves, there could be approximately N–1 virtual read zones created by antenna overlap between pairs of antennae. However, any number of virtual read zones can be used or designated.

Table 1A illustrates antennae arranged in a two-dimensional array (5 rows each having 4 antennae) that could, for example, be antennae associated with a shelf system. In this embodiment, there are 20 read zones (e.g., a, b, c, d, etc.). A "virtual zone" may be defined by the volume or area overlapping the read zones of two or more antenna. For example, horizontal virtual read zones may be assigned to the existing overlap areas designated in Table 1 as "ab," "bc," "cd," etc., where horizontal overlap of RFID reader antenna coverage occurs between adjacent antennae in the same row. Vertical virtual read zones as designated in Table 1 as "ei," "im," "mq," etc., may exist where vertical overlap of RFID reader antenna coverage occurs between adjacent antennae in the same column. Diagonal virtual read zones, as designated in Table 1 as "kp," for example, may also be defined where diagonal overlap of RFID reader antenna coverage occur between diagonally adjacent antennae. As illustrated in Table 1B, while an antenna array having 5 rows and 4 columns can comprise 20 actual read zones, the antenna array may further comprise, for example, 55 virtual read zones. An antenna array having 5 rows and 20 columns while comprising 100 actual read zones may further comprise, for example, 302 virtual read zones.

It should be understood that virtual read zones can occur in three dimensions if overlap occurs in a third direction (e.g., z-axis), for example, if RFID reader antennae are in a shelf system, and antenna read coverage overlaps to the next aisle over (that is, on the "back" side of a given shelf fixture), or if antenna coverage overlaps to antennae associated with shelves across an aisle. Three dimensional overlap may also occur, for example, if RFID reader antennae are used in a warehouse or other facility where aisles are narrow. For example, an automated library can employ RFID reader antennae associated with book stacks that may move side to side on rollers. In this example, aisles can optionally be opened or closed in order to more efficiently use a limited space.

FIG. 1A shows an exemplary front elevation view of an RFID antenna system used in a shelf arrangement in accordance with a preferred embodiment of the invention. FIG. 1B shows an exemplary top plan view. In a preferred embodiment, Shelf 100 supports RFID reader antenna 110, which can generate an RF field defined by, for example, periphery 112 or volume 114. It will be understood that the RF field may be defined by any suitable measure (e.g., periphery, area, and volume). The RF field may detect and read information from RFID tag 118 on tagged item 116. Additional RFID reader antenna 120 may be present, which generates an RF field defined by periphery 122 or volume 124. More than two RFID reader antennae may also be present. In FIG. 1A, RFID tag 118 is shown on tagged item 116. For simplicity in the following exemplary figures, RFID tags are usually not shown, but it will be understood that each individual tagged item described has an associated RFID tag, which has a unique identification (e.g., a serial number, string descriptor, or other unique ID) that may be associated with the individual tagged item.

Note that the RF field from RFID reader antenna 110, and defined by, for example, periphery 112 or volume 114, is shown as unidirectional, specifically directed upward in this case, which can be achieved, for example, by placing an RF-blocking material 105 such as a thin metal sheet on the lower surface of the shelf. This RF-blocking material may alternately be within the shelf. The RFID reader antennae may also be within the shelf. Alternatively, the RF field from an RFID antenna can be bidirectional or omni-directional depending on the desired application and area for detection.

In FIG. 2, the same shelf arrangement is shown in an exemplary front elevation view, with additional tagged items added. In particular, tagged item 216 is shown which is outside the range of the RFID reader antenna 110, that is, outside the exemplary periphery 112 or volume 114 that defines the field of RFID reader antenna 110. Therefore, in this example, tagged item 216 may not be detected by the RFID reader antenna 110.

To remedy this situation, as shown in FIG. 3A and FIG. 3B, the RF field strength may be increased, for instance, by increasing power to the RFID reader antenna 110 resulting in a stronger RF field (as shown, for example, by periphery 312 or volume 314) capable of detecting tagged item 216.

An exemplary consequence of using the stronger RF field for RFID reader antenna 110 is that its coverage, defined by, for example, periphery 312 or volume 314, may now overlap coverage of an adjacent RFID reader antenna 120 (whose RF field coverage is denoted by periphery 322 or volume 324), and may even detect tagged item 326 located proximate to RFID reader antenna 120. Item 326 may now be detected on both RFID reader antennae 110 and 120. An area of overlapping RF coverage may exist between the two antennae, as denoted by periphery 342 or volume 344.

Although tagged item 326 is read by two reader antennae, it need not be counted twice by the inventory system. The RFID tag associated with tagged item 326 will have a unique identification number, and the inventory system seeing the same ID number twice, may be operated, in accordance with a preferred embodiment of the invention, to only count tagged item 326 one time.

The term "location," in reference to an item may have several meanings. In one embodiment, the term "Stock Plan" refers to an intended, preferred, or pre-assigned location. For example, an item can be located in an orderly layout such as a planogram. A "Stock Plan" can also refer to a set of rules that permit an item to be assigned to a location if certain conditions are met (e.g., a plurality of items is associated with a first antenna detection zone compared to a second antenna detection zone). An "actual" location can refer to where an item is physically located. A "detected" location can refer to a location where a tagged item is detected by one or more RFID reader antennae. In another embodiment, the term "deduced" (or calculated or probable) location based on a set or sets of rules which assign locations based on predetermined criteria as described herein.

In one embodiment, locations may be related to RFID reader antenna or antennae. Another embodiment provides for relating locations to structures associated with the RFID reader antennae, for example, to shelves and other structures associated with the RFID reader antennae. Thus, when a tagged item is assigned a deduced location related to an RFID reader antenna, the deduced location may also be readily related to structures such as shelves or other support structures that hold tagged items. For example, a user may refer to a location based on a particular designation (e.g., "Item located at Shelf 10, Level 3") or similar, rather than a general designation (e.g., "Item located at Antenna 43.").

FIGS. 3A and 3B illustrate an exemplary determination of the deduced location of tagged item 326 that has been detected by more than one antenna. One deduced location may be defined as a virtual read zone or overlap zone (e.g., denoted by periphery 342 or volume 344) containing any tagged item 326 that is detected by both antennae 110 and 120. Such virtual read zones could exist for all combinations of two or more antennae.

A preferred embodiment involves analyzing the detected locations of all items similar to tagged item 326, for example, all items having the same SKU (stock keeping unit) or UPC (universal product code), and following a set of rules to determine deduced (probable or logical) locations to assign the tagged items, for example, as shown in Table 2. For example, tagged items similar to item 326 read by two antennae could be deduced to be located or apportioned to the antennae 110 and 120 as shown in the examples of Table 2.

According to the example in Table 2, items with RFID tags have been detected by antennae, and a group of one or more tagged items with a particular SKU number have been detected by more than one antennae. For example, six items were detected by antenna 110, 18 items were detected by antenna 120, and seven items were detected by both antennae 110 and 120. Based on these detected locations, appropriate deduced or calculated locations may be determined as described in the following paragraphs. Although the example is given for only two antennae 110 and 120 and one corresponding virtual read zone 342, it should be understood that the invention may be extended to situations involving any number of antennae and any number of virtual zones.

In a preferred embodiment, "virtual zone" locations can be assigned. For example, items detected only by a single antenna (e.g., either 110 or 120) can be deduced to be located at that antenna. Items detected by both antennae 110 and 120 can be deduced to be located within "virtual read zone" 342 which, in this case, may be represented by the volume or three-dimensional space between the two antennae or proximate to the border between the two antennae.

In another preferred embodiment, zones or detection areas can be assigned or located according to a predetermined set of criteria. For example, an "antenna-winner-take-all" set of criteria can be applied to assign an item or series of items to an approximate location in the zone assigned to the antenna which detects the largest number of items. Referring to Table 2, "antenna-winner-take-all," items are deduced to be located at antenna 120, which detected the largest number of the items. If both antennae had detected an identical number of the items, then the item locations may be deduced to be equally split between antennae 110 and 120, or, another assignment rule may be invoked.

In another preferred embodiment, "Antenna Proportional" criteria can be applied to assign locations to an item or group of items according to the proportion of items detected by a first antenna compared to at least a second antenna. In this example, a relatively accurate location assignment can be provided without using virtual read zones. The relative proportion of items detected by a first antenna and at least a second antenna can be based on the RFID data from the antennae. For example, each of the antennae 110 and 120 is deduced to hold those items detected solely by that antenna. Items detected by both antennas are apportioned according to the percentage of items detected solely by each antenna. For example, since antenna 110 detected six units and antenna 120 detected 18 units (respectively 25% and 75% of the total of 24 items), then the additional 7 items detected by both antennae are deduced to be located 25% (7.times.¼ or 1.75 items) at antenna 110 and 75% (7.times.¾ or 5.25 items) at antenna 120. If it is not desirable to use fractions of units, the apportionment may be rounded off to 2 and 5 items respectively.

In another preferred embodiment, "Antenna Plurality or 50% majority" zone or location assignment rules can be applied to determine the location of items detected by two or more antennas. This principle may be used, for instance, when it is desired to have any items read by more than one antenna all assigned to a single antenna, and any items read by only one antenna, assigned to that specific antenna. Using the example above, the additional seven items detected by both antennae 110 and antenna 120 are deduced to be located in the zone or location assigned to antenna 120 since a majority of the items (18) were detected solely by antenna 120.

Preferred embodiments provide "Antenna ⅔ majority" and "Antenna 80% majority" location assignment criteria. In these embodiments, the items detected by, for example, both antenna 110 and antenna 120 are assigned to the antenna which detects at least ⅔ or 80% respectively of the items solely within its assigned location. For example, if antenna 120 detected 80% of the items in its assigned zone or location, then all of the items detected by both antenna 110 and antenna 120 would be assigned to the antenna 120 associated zone or location. These criteria are variations of the "Antenna 50% majority", but have a higher threshold before the items detected by multiple antennae are apportioned to a single antenna.

Thus, these criteria represent exemplary subsets of a more general "Antenna x % majority" where x % would typically be a value between 50% and 100%. Depending on the number of multiple antennae that detect a given item or items, the x % necessary for a data majority may not be achieved, in which case the apportionment may fall back to another set of criteria such as antenna proportional or virtual read zone. In the specific example on Table 2, antenna 120 detected 75% of the singly-detected items (18 out of 24), and thus would meet the criterion of a ⅔ majority, and hence would be deduced to hold the 18 items detected solely by antenna 120, plus all seven items detected by both antennae. However, 75% would be insufficient under the 80% majority criteria, and therefore the 80% majority criteria would not apply. Alternatively, the antenna proportional criteria may be applied. Since the "antenna majority" and "antenna proportional" criteria are not "winner-take-all" principles, antenna 110 would still be deduced to hold the six items detected solely by antenna 110.

In another embodiment, a set of criteria referred to as "stock plan" criteria can be used to assign locations or zones to an item or group of items. Referring to the example in Table 2, the stock plan (sometimes called a "planogram") for this particular SKU is to assign or place 20 items as associated with antenna 110, and 30 items as associated antenna 120. Thus, the placement of items in a zone or location is not necessarily based on actually detecting the item in a particular location, but rather on a predetermined plan to stock items in a given location or locations.

In one embodiment a "Stock Plan winner-take-all" location assignment criteria is used. This exemplary set of criteria can be used when it is desired to simply count the items and assign an approximate location. All the items are deduced to be located at antenna 120, which according to the stock plan was supposed to have largest number of the items.

In one embodiment a "Stock Plan split" location assignment criteria may be used. If both antennae according to the stock plan should have an identical number of the items, then the item locations may be deduced to be equally split between antennae 110 and 120, or, another assignment rule may be invoked.

A "Stock Plan Proportional" location assignment criteria embodiment can be used to apportion the location of items among two or more antennae. For example, each of the antennae 110 and 120 is deduced to hold those items detected solely by that antenna, plus the items detected by both antennae are apportioned between the two antennae in proportion to the assigned number of items in the stock plan. In this instance, since the stock plan assigned antenna 110 to have 20 items and antenna 120 to have 30 items (respectively 40% and 60% of the total of 50 items), then the additional 7 items detected by both antennae are deduced to be located 40% (0.4.times.7 or 2.8 items) at antenna 100 and 60% (0.6.times.7 or 4.2 items) at antenna 120. If it is not desirable to use fractions of items, the apportionment may be rounded off to 3 and 4 items respectively.

The "Stock Plan Plurality or 50% majority" location assignment criteria embodiment apportions the location or zone assignment of one or more items. The apportionment decision is based on the stock plan assigned numbers. Thus, for example, antennae 110 is deduced to hold the six items detected solely by that antenna, while antenna 120 is deduced to hold the 18 items detected solely by that antenna, plus all the items detected by both antennae since antenna 120 was assigned under the stock plan greater than 50% of the total items assigned to each antenna.

A "Stock Plan ⅔ majority" and "Stock Plan 80% majority" location assignment criteria assign the location of an item or series of items using a higher threshold before the items detected by multiple antennae are apportioned to a single antenna. These criteria represent subsets of a more general "Stock Plan x % majority" where x % would typically be a value between 50% and 100%. Depending on the number of multiple antennae assigned by stock plan to hold a given item or items, the x % necessary for a stock plan majority may not be achieved, in which case the apportionment may be determined according to other criteria (e.g., stock plan proportional or virtual read zone). In the specific example on Table 2, the stock plan called for 60% of the items to be placed with RFID reader antenna 120, and while the 60% would meet the criterion of a 50% majority, it would not meet a ⅔ or 80% majority.

It should be understood that while a user may choose to implement one of the exemplary criteria sets depicted in Table 2, or a variation on those principles, the user may further choose to implement several of the principles in Table 2, preferably in a hierarchical sequence or series such that if one set of criteria does not resolve an item location, additional criteria may be applied to determine the appropriate location of an item or group of items.

For example, multiple factors or criteria may be incorporated into a logical method of assigning apparent location. In one embodiment, the store stocking plan may assign all of a certain (or similar) product to RFID reader antenna 110. If the RFID data show the detected product locations to be mostly at RFID reader antenna 120 with a few units at RFID reader antenna 110, the system could by logical calculation allocate all the units to antenna 110 according to the assigned stocking plan, despite the fact that only a few units were detected in the zone of antenna 110. Such stocking plans often incorporate graphical presentations called planograms. Alternately the system could allocate all the units to RFID reader antenna 120 according to the RFID data showing most of the units to be at RFID reader antenna 120.

In another embodiment, a fraction or a percentage of an item can be assigned to one or more locations (e.g., a detection zone of an RFID antenna). For example, 50% of an item detected by two antennae (e.g., a "joint item") can be assigned to a first detection zone. In another embodiment, 33% of a joint item is assigned to a first detection zone, a second detection, and a third detection zone. In yet another embodiment, 50% of a joint item is assigned to a first detection zone, 25% of the joint item is assigned to a second detection zone, and 25% of the joint item is assigned to a third detection zone. Three detection zones can be arranged where a first detection zone is adjacent to a second detection zone on one side and a third detection zone on the other side. In accordance with another embodiment of the invention, 100% of a joint item can be assigned to the first detection zone and 0% of the joint item can be assigned to the second and third detection zones adjacent to the first detection zone.

Any number of different criteria can be devised to deduce the location of one or more items. In a preferred embodiment, for example, the location of an item can be deduced by determining the distance of the item from an RFID antenna in a particular detection zone. If the distance, for example, is less than a predetermined distance, then it is deduced that the item is located in the detection zone for that RFID antenna. The determination of the distance between the item and the RFID antenna can be done using any means (e.g., infrared sensor, GPS, etc.) known in the art.

In another embodiment, the system could have several modes of displaying data. A simplified display could be used for locating approximate positions of the merchandise, which may be familiar to an employee. In this display, the data would be simplified according to the intended stocking plan. Another case would be a maintenance display where the data are shown exactly as detected, even with virtual read zones, to help the retailer plan whether shelf filling or refacing was necessary. The data from the RFID system may be incorporated into planograms.

In FIG. 4, another antenna arrangement is shown in front elevation view, with two shelves 400 and 450 located one above another. In this case RF-blocking materials are not used to restrict the RFID reader fields. Therefore antenna 410 can project an RF field both upward (as denoted by periphery 412 and volume 414) and downward (as denoted by periphery 412' and 414'). RFID reader antenna 410 may detect tagged items such as 116 and 216 adjacent to antenna 410, but may also detect tagged item 326 within the zone covered by the adjacent antenna 420. Below RFID reader antenna 410, associated with shelf 450, is another RFID reader antenna 460, which has an RF field projecting both upward (as denoted by periphery 462 and volume 464) and downward (as denoted by periphery 462' and volume 464'). Tagged item 416 resting on RFID reader antenna 460 is detected by the RF field 462 from antenna 460, but also by the RF field 412' from antenna 410.

In this example, a virtual read zone (denoted by periphery 442 and volume 444) may be defined as shown between RFID antennae 410 and 460. Additional virtual read zones may be defined for other spatial volumes that are covered by the RF field from two or more antennae. Furthermore, some tagged items such as tagged item 417 may be located such that they are detected by RF fields from more than two antenna (the additional RF fields are not shown).

In another embodiment, FIG. 5A presents a side elevation view (and FIG. 5B a top plan view) of an arrangement where the RFID reader antennae are in a vertical position. For example, vertical support 500 may be provided with RFID antenna 510. (It would also be possible to conceal the RFID reader antenna within the vertical support 500). RFID reader antenna 510 produces an RF field (denoted by periphery 512 and volume 514) that covers a shelf 520 and the tagged items 526 on shelf 520. The RF field 512 further covers another shelf 530 and the tagged items 536 on that shelf. Antenna 510 has a unidirectional read coverage, for example, due to the presence of a RF blocking layer 505 within the support 500. The RF field 512 from RFID reader antenna 510 is strong enough to detect tagged items on both shelves 520 and 530. The tagged items 526 and 536 on these shelves may be similar, for example, having the same SKU (or significant part thereof), in which case the location of the items may be assigned based on one or more other location assignment methods. For example, the location assignment may be based on a proportionality defined by a stocking plan, or by the relative sizes of the shelves. For example, if shelf 530 is larger than 520, a larger proportion of items may be assigned to shelf 530.

In another embodiment, the tagged items 526 and 536 may be dissimilar, for example, having different SKUs. In such a case, the system may deduce from the stocking plan which shelf 520 or 530 is most likely to contain a detected tagged item 526 or 536.

In yet another embodiment, RFID reader antenna 510 may be arranged in a back-to-back orientation relative to a second RFID reader antenna 540 with its own unidirectional RF field (denoted by periphery 542 and volume 544) that covers shelf 540, along with the items 546 on that shelf. The RF field 542 from RFID reader antenna 540 also covers a pegboard display, having hooks 550 holding items 556, and hooks 560 holding items 566.

In this embodiment, the RF field 542 from RFID reader antenna 530 is strong enough to detect tagged items on both shelf 540 and pegboard hooks 550 and 560. In addition, the tagged items 546 on the shelf 540 are likely dissimilar from the tagged items 556 and 566 on pegboard hooks 550 and 560. Therefore, the system may deduce from the stocking plan the likelihood whether a detected tagged item should be associated with shelf 540 or pegboard hooks 550 or 560. For example, the stocking plan may include the probability that the tagged items 556 and 566 are similar to the tagged items on shelf 540 or pegboard hooks 550 or 560.

In a preferred embodiment, FIG. 6 shows a side elevation view of RFID reader antenna 610 whose RF field reads bi-directionally, for example, to the left (as denoted by periphery 612 and volume 614) and to the right (as denoted by periphery 612' and 614'), so that it may read tagged items on two sides of a vertical support 600 of a display structure. For example, the two sides of the vertical support 600 might be two separate aisles in a store or warehouse. Such an arrangement may be desirable, for example, to reduce the cost of the system. Although the single RFID reader antenna 610 may detect many different types of tagged items, if the tagged items are different (for example having different SKU numbers) and this information may be obtained from the RFID tags for the tagged items, then the determination of which supports (shelves 620, 630, 640 or pegboard hooks 650, 660) should be associated with items 626, 636, 646, 656, and 666, may deduced using the methods explained earlier. For example, tagged items 626, 636, and 646 may all be known from their SKUs as being typically placed on a particular shelf. The stocking plan can determine which (e.g., shelf 620, 630, or 640) is the preferred location for a particular item. The SKUs may indicate whether tagged items 656 and 666 may be known as typically being placed on hooks. The preferred particular hook 650 or 660 may be known from a stocking plan.

In another embodiment, FIG. 7 shows various types of tagged items supported on a support fixture 700 such as a store display fixture. The tagged items have features that make them suitable for placement on various support means. For example, tagged items 716 have a slot 717 that fits over hooks 718. Items 726 have a tab 727 that can be grasped by clips 728. Items 736 are not adapted to be supported by hooks or clips, but instead are supported on shelf 738.

In one example, an RFID reader antenna 750 having a detection zone capable of detecting items 716, 726, and 736 may be provided. Using one antenna may be economical. However, it would be advantageous to know more precisely the location of items detected by RFID reader antenna 750. Alternately, several RFID reader antennae 710, 720, and 730 could be used, for example, each providing read coverage for an area expected to include a particular type of tagged item. If multiple RFID reader antennae 710, 720, and 730 are used, more than one of the RFID reader antennae may detect a particular item. It would be advantageous to know which of the several RFID reader antennae was actually associated with a detected tagged item.

Since tagged items 716 can be adapted for support on hooks 718, the system may preferably assign any detected items 716 to be located on hooks 718 or in the area associated with hooks 718 (or with RFID reader antenna 710 if multiple antennae are used) Likewise since tagged items 726 are adapted for support on clips 728, the system may preferably assign any detected tagged items 726 to be located on clips 728 or in the area associated with the hooks (or with RFID reader antenna 720 if multiple antennae are used). Furthermore, since tagged items 736 are adapted for support on shelf 738, and not adapted for support on hooks 718 or clips 728, the system may preferably assign any detected tagged items 736 to be located on shelf 738 or in the area associated with the shelf (or with RFID reader antenna 730 if multiple antennae are used).

In a preferred embodiment, the location of an item detected by more than one antenna can be determined by reducing the power of each antenna to reduce the overlap between the two antennas. For example, referring to FIG. 3, when the antennae are operated at power levels that detect tagged item 216 representative of a maximum range, item 326 is consequently detected by both antennae 110 and 120. The system may determine whether more than a certain threshold number of tagged items (for example a specific number or a percentage) is detected by more than one antenna. Consequently, the system may reduce each antenna's power to at least one lower level, and use the resulting information to determine, for some or all of the tagged items in question (such as tagged item 326), the location of the item (e.g., within the detection field of a single RFID reader antenna such as antenna 120). The system thereafter could return to normal antenna power to make sure that all tagged items were detected (such as tagged item 216 at a further read range).

Figure 9:
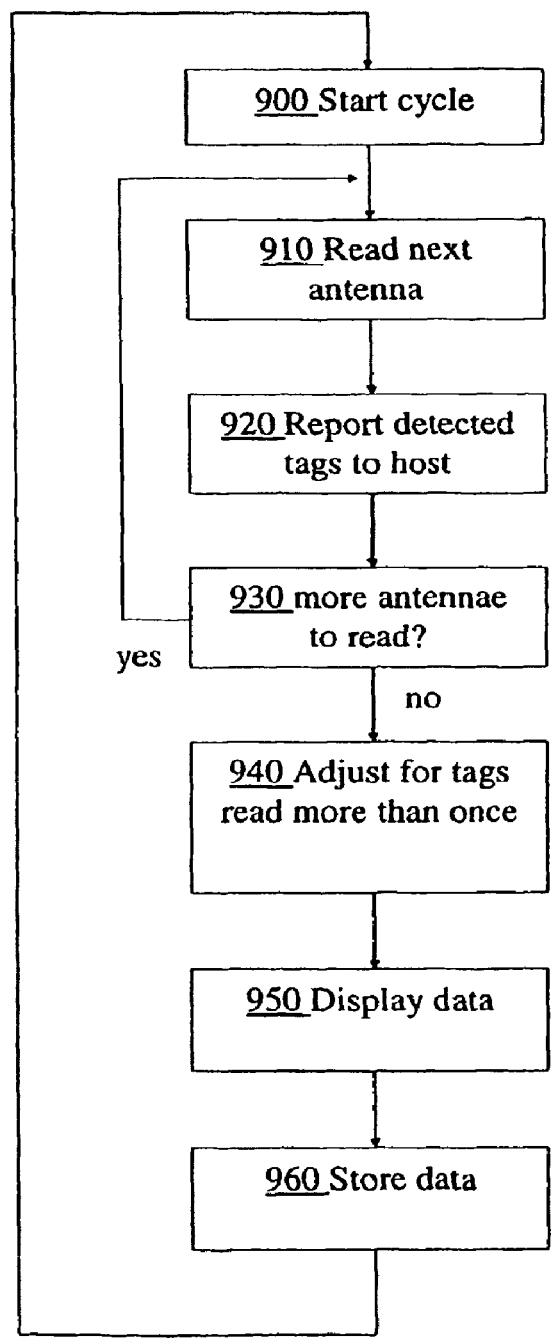
FIG. 9 illustrates a flow diagram of an exemplary method of reading RFID tags using several RFID reader antennae in accordance with a preferred embodiment of the invention.

FIG. 9 illustrates a preferred embodiment of systems and methods for obtaining and filtering information regarding the location of items in accordance with the invention. In step 900, a reading cycle is initiated. In step 910, the next antenna is read to detect tags within the read range of that antenna. In step 920, tags that are detected are reported to a host computer. In step 930, the system determines whether there are more antennae to be read. If so, the process repeats with the next antenna. If all the antennae have been read, the process continues with step 940 by adjusting for tags that have been read more than once. This may, for example, be done by the host computer sorting the data from read tags and only counting any tag one time. In step 950 the data may be displayed, for example, on a monitor or a printed output. In this sense "display" may also be taken to mean dissemination to other locations or computers, for example, over a local area network or the Internet. In step 960, the data may be stored, for example, in a database. The process is then repeated starting with step 900.

The process described in FIG. 9 may be inefficient in some cases. For example, in step 920, reporting detected tags to the host computer, tags that are read by more than one antenna will be reported more than one time, which may increase the traffic on whatever communication link is used. For example, such a communication link could be an RS-232 link, an RS-485 link, an Internet or LAN connection, or other links typically used in data communications. It may be preferable to only report a tag only once, even when it is read by more than one antenna. Furthermore, if the tag had been present previously, it may be preferable not to report it repeatedly each read cycle. In one implementation, for example, if an item is detected during a first read cycle and is again detected during subsequent read cycles during a period less than a predetermined length of time, the detection of the item during the subsequent cycles can be suppressed (e.g., not sent to the host computer). In another embodiment, if an item is detected during a first read cycle and is again detected during a period less than a predetermined number of read cycles, the detection of the item during the subsequent read cycles can be suppressed (e.g., not sent to the host computer). In another implementation, if an item is detected by a first antenna and then subsequently detected by at least a second related antenna, the detection of the item by the at least a second related antenna can be suppressed.

Figure 10:
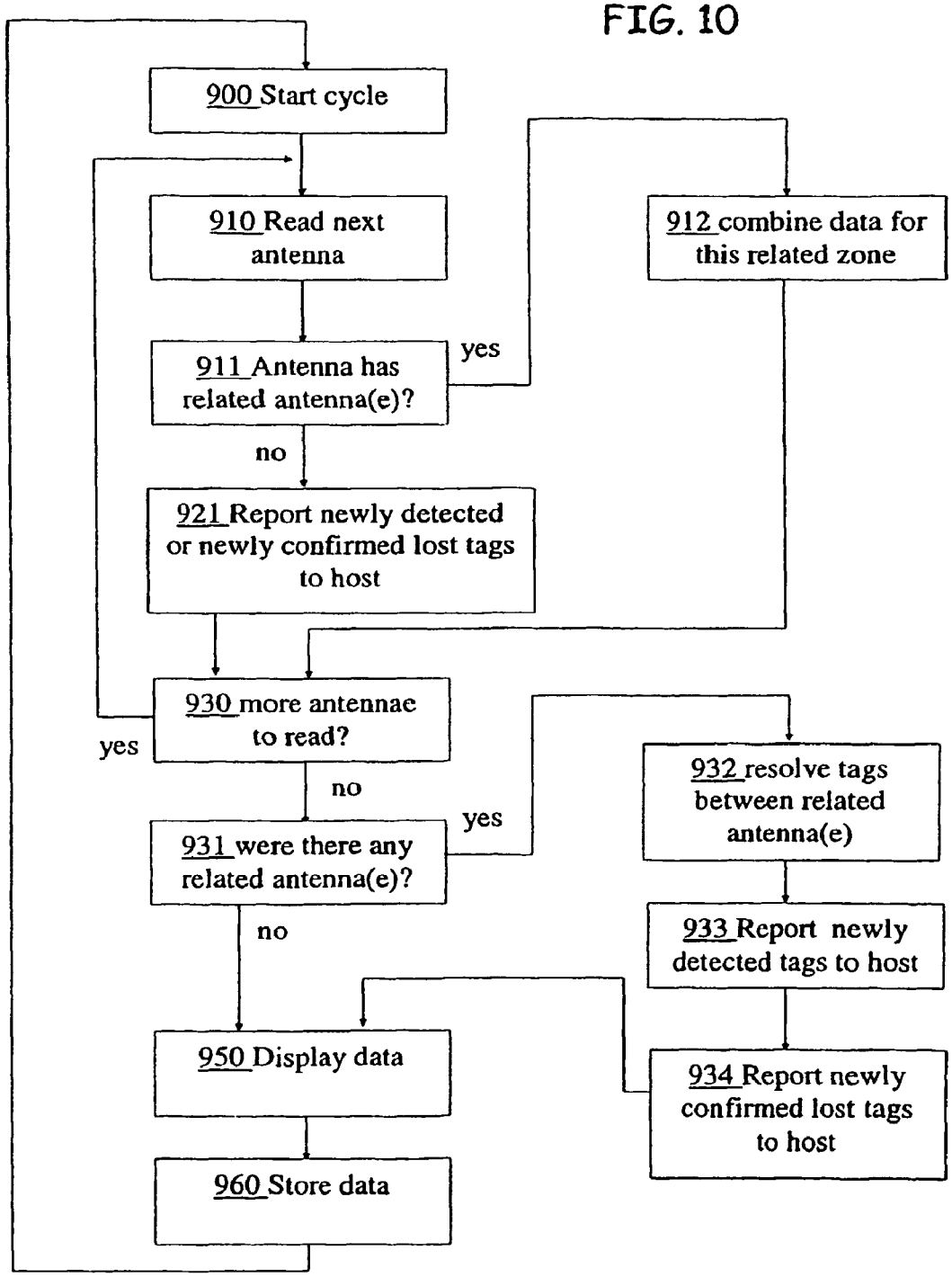
FIG. 10 illustrates a flow diagram of another method of reading RFID tags using several RFID reader antennae in accordance with a preferred embodiment of the invention.

FIG. 10 illustrates a system and method of filtering information regarding tags that are counted more than once by identifying related zones or detection areas. In accordance with a preferred embodiment, "related zones" or detection areas are identified and can be stored, for example, in a table. The term "related zones" refers to a relationship between two or more antennae indicating likelihood that they will share an overlapping read coverage.

As illustrated in FIG. 10, after step 910 of reading the tags associated with a given RFID reader antenna, the system determines whether the antenna has related zones (step 911). If so, the system places the tag data for the current antenna into a storage area for a group of related zones in a memory or buffer to be processed after all related antennae, or all antennae, have been read (step 912). If the antenna just read in step 910 has no related zones, then the tag data may be reported to the host (step 921). Alternately, an antenna with no related zones may still be defined itself as a "group of one" and its tag data stored in a storage area to be processed later, for example, after all antennae have been read.

In step 930, it is determined whether there are additional RFID reader antennae to read, and if so, the next antenna is read in step 910. If all the antennae have been read, then in step 931 it is determined whether "related zones" processing has occurred. If "related zones" are defined, the system may "resolve" the duplicate tags detected in each related zone (step 932). The term "resolving" refers to removal of duplicate tag read data, and assignment of the read tags to one or more of the related zones within that group. Various rules may be used for determining the assignment of items to a particular related zone.

For example, if a related antenna group consists of two adjacent antennae A and B, and after removing duplicate reads, the system determines that antennae A has read 5 DVDs of a particular title, whereas antenna B has read 2 DVDs of the same title, then the system may assign all the DVDs to antenna A, according to a "winner-take-all" principle as described herein. Other assignment methods may be used, such as assigning any duplicate-read DVDs to the antenna that first read each one.

If related zones are not identified, then data may be displayed in step 950 as previously described (the intervening step 940 of removing any duplicate data may also be used, but is not shown here).

In another preferred embodiment, the system may utilize information about the products attached to the tags to assign the location of items detected by related antenna. The system may incorporate data related to the inventory capacity associated with an antenna, and about the physical size of each SKU in the inventory. For example, the display space associated with antenna A may be known to hold a maximum of six standard DVDs within safer devices. Furthermore, the system may incorporate data comprising the physical size of a DVD product, for example, standard size, double thickness (such as a boxed set), or 1.5.times. thickness etc. Thus, in one embodiment, the system in step 932 resolves through a "plurality vote" method that, for a given standard sized DVD title, there are 7 DVDs in zone A and 2 DVDs in related zone B, but that furthermore zone A has a maximum capacity of six standard sized DVDs. The system may correct its allocated amounts to assign six of the DVDs to zone A and 3 of the DVDs to zone B.

The "resolution" of items detected by more than one antenna in related zones avoids the problem of a tag that intermittently is detected by different antennae within a related zone. Rather than reporting to the host each time the tag appears to move to another antenna, step 932 allows the system to filter "noisy" data and thereby reduces traffic on the communication link to the host, as well as reducing the amount of data that may be stored in step 960.

In step 933, the system may report the tag data to the host computer. In one embodiment, as shown in step 933, the detection of the tag is reported to the host computer or controller only when newly detected tags are found. In this embodiment, the data traffic over the communication link can be reduced. In order to report a tag as being present within range of an antenna, the system may require the tag to be detected one time, or it may require the tag to be detected several times within a short time, or several times consecutively.

In another embodiment, Step 934 provides a "confirmed lost" function, for reporting tags that were read as present but now are not read as present. For example, a confirmed lost item can be missing for a certain number of read cycles, or a certain length of time, before it is "confirmed" lost and reported as such. The confirmed lost step 934 may compensate for one or more of the following occurrences: a tag at or near the detection limit of an antenna, which may not be detected every cycle; a tag on a DVD that is picked up and handled by a customer, and hence not detected for one or more cycles, or a tag that is attached to a DVD in packaging that makes tag detection sporadic (e.g., a DVD package incorporating a metallic or foil material). In the last case, the system may be made aware, through information associated with one or more SKUs, about those SKUs for which an attached tag may be less readily detected. The system may use a higher number of read cycles for items associated with such an SKU before confirming that the item is missing.

Steps 932-934 of FIG. 10 may be operated as a group during the overall read cycle (e.g., during the time between repeating step 900), for example, at the beginning, end, or some midpoint within the cycle. Alternately, these steps may be carried out intermittently during the cycle; for example, after step 911 if it has been determined that all related zones within a group have been processed during the current cycle. Following step 934, the processing may continue with step 950, the display of data as previously described, and with step 960, the storage of data. The overall cycle may then repeat at step 900 continuously, periodically, or upon event or demand.

Figure 11:
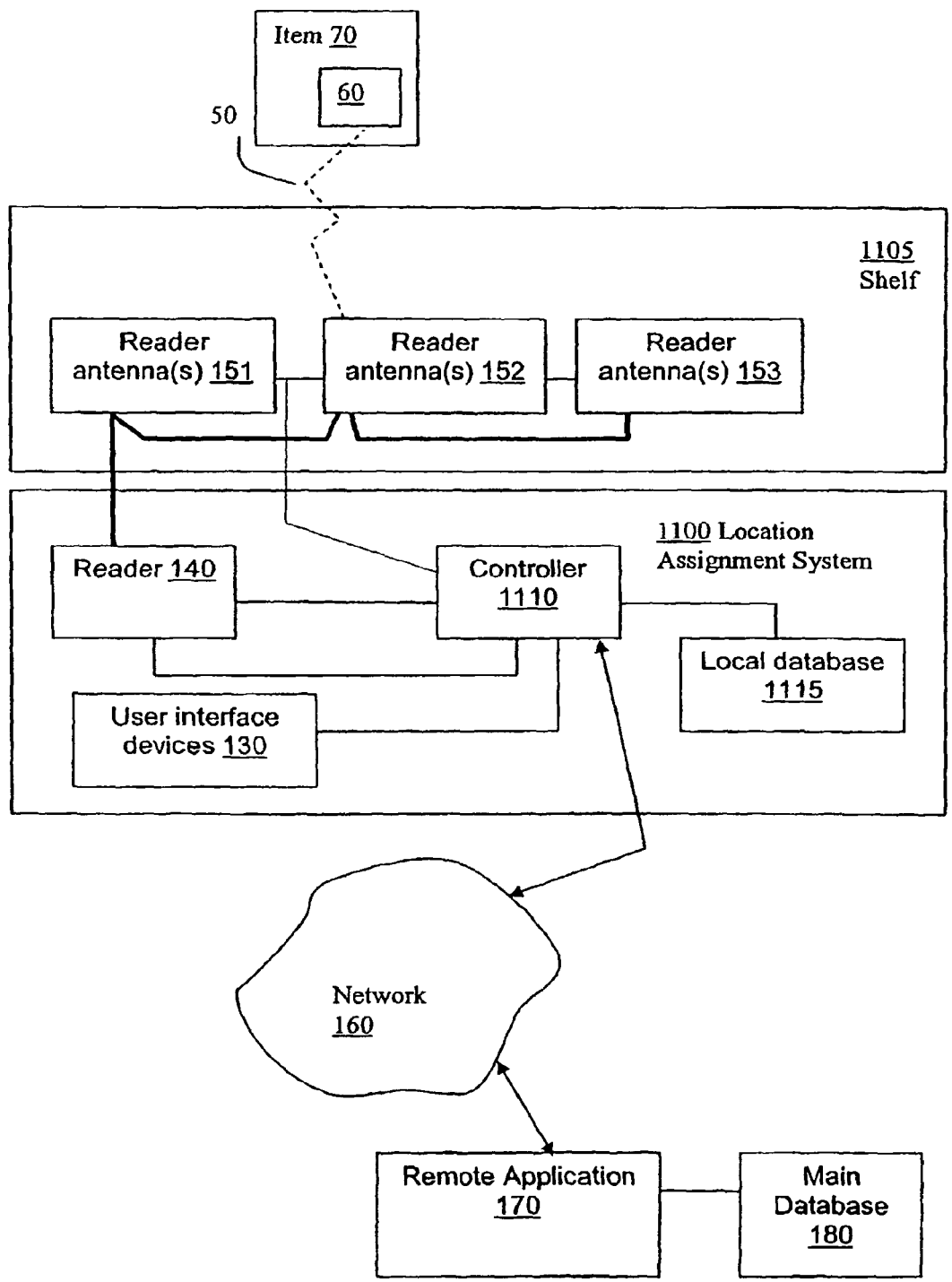
FIG. 11 illustrates a Location Assignment System in accordance with a preferred embodiment of the invention.

In a preferred embodiment, any or all of the methods, operations, or other functionality described herein may be implemented as a result of operation of Location Assignment System 1100 as illustrated in FIG. 11. The exemplary Location Assignment System 1100 preferably includes a Controller 1110 coupled to a Local Database 1115, a Reader 140, and User Interface Devices 130. In this embodiment, Controller 1110 may include one or more central processing units (CPUs) or other calculating or processing devices to provide processing of input/output data between Location Assignment System 1100, Network 160, Local Database 1115, a Reader 140, and User Interface Devices 130.

Preferably, Controller 1110 executes one or more computer-executable programs stored in memory (e.g., Local Database 1115). Local Database 1115 can include one or more memory devices comprising any recordable or rewritable medium for storing information (e.g., hard drive, flash RAM, optical disc, compact disc, DVD). User Interface Devices 130 include any device that can be used to enter information (e.g., commands, data) into Controller 1110 (e.g., keyboard, wireless device, PDA, infrared device, radio frequency device)

In a preferred embodiment of the invention, Location Assignment System 1100 may further include Reader 140. Reader 140 can be used to interrogate one or more of a plurality of Reader Antennae (e.g., Reader Antenna 151-153) coupled to Reader 140. In this exemplary implementation, Reader Antennae 151-153 are incorporated in shelf 105 and may include switching and tuning circuitry as described in U.S. patent application Ser. No. 10/338,892, which is incorporated herein by reference in its entirety. Reader 140 transmits the information obtained from Reader Antenna 151-153 to Controller 140 in a manner well known in the art.

In a preferred embodiment, Reader Antenna 151-153 are preferably RFID reader antennae capable of generating radio frequency waves 50. The radio frequency waves interact with RFID tags 60 which can be affixed to an object (e.g., product, employee, customer). An RFID tag 60, when excited by radio frequency waves 50, produces a disturbance in the magnetic field (or electric field) that is detected by RFID reader antennae. Preferably, reader 140 may be instructed by Controller 1110, for example, to interrogate, read, or otherwise activate one or more reader antennae (e.g., Reader Antennae 151-153). For example, Controller 1110 may instruct Reader 140 to interrogate Reader Antennae 151-153 by reading Reader Antenna 153 followed by Reader Antenna 152 followed by Reader Antenna 151.

In accordance with a preferred embodiment of the invention, the reader antennae may be affixed to a mobile or stationary object. As depicted in the exemplary implementation of FIG. 11, Reader Antennae 151-153 are affixed to a product support structure such as Shelf 105. Reader Antennae 151-153 can be used to communicate by, for example, radio frequency waves 50 with RFID tags such as RFID 60, shown attached to item 70.

Location Assignment System 1100 may be connected directly or indirectly (e.g., through network 160, as shown in FIG. 11) to one or more Remote Applications 170 coupled to Main Database 180. Network 160 may represent any type of communication configuration that allows Location Assignment System 1100 and Remote Application 170 to exchange information. For example, network 160 may be a Local Area Network (LAN), a Wide Area Network (WAN), Bluetooth™, and/or a combination of networks, such as the Internet. Network 160 may also include the infrastructure that allows Location Assignment System 1100 and remote application 170 to exchange information using wireless based communications.

Preferably, Local Database 1115 and Main Database 180, in each instance, may include one or more storage device systems that store information (e.g., computer executable programs, data regarding products and/or facilities) used by Location Assignment System 1100 and/or Remote Application 170. The term "database" can refer to the means for storage of more than one data file, computer executable program, or table. In a preferred embodiment, Local Database 1115 and/or Main Database 180 may comprise more than one database or a series of databases housed locally or in a remote location. Such databases may be controlled, for example, by a database server (not shown), such as an SQL database server. A Java DataBase Connectivity (JDBC) driver for the SQL server may also be used to access the SQL server database. Local Database 1115 and/or Main Database 180 may be embodied within Location Assignment System 1100, or external to Location Assignment System 1100, for example, on a server (not shown). Furthermore, Local Database 1115 and/or Main Database 180 may be shared with more than one Location Assignment System 1100.

In accordance with a preferred embodiment, Local Database 1115 and/or Main Database 180 may be used to store item or object information (e.g., identification information regarding an item such as Stock Keeping Unit (SKU data)). The SKU information may include item type, manufacturer and origin, size, color, style, as well as a wide variety of other types of information that are understood by those skilled in the art. Such item information may be stored, for example, in tables maintained on Local Database 1115 and/or Main Database 180 or in a remote or local database or system.

One skilled in the art will appreciate that the above examples of item information are not intended to be limiting. Local Database 1115 and/or Main Database 180 may include more or fewer tables or other configurations of item information used by Remote Application 170 and/or Location Assignment System 1100. Some or all of the information in Main Database 180 may also be stored in Local Database 1115.

The foregoing description reveals several methods that may be used to logically assign locations to tagged items that are detected by more than one RFID reader antenna. The methods may be used in combination with each other, in which case they may preferably be utilized in a prioritized sequence.

EXAMPLES

The following are examples of specific implementations of preferred embodiments of the invention. As can be appreciated by those of ordinary skill in the art, any number of other implementations of the embodiments of the invention may be achieved when reducing embodiments of the invention to practice.

Figure 8:
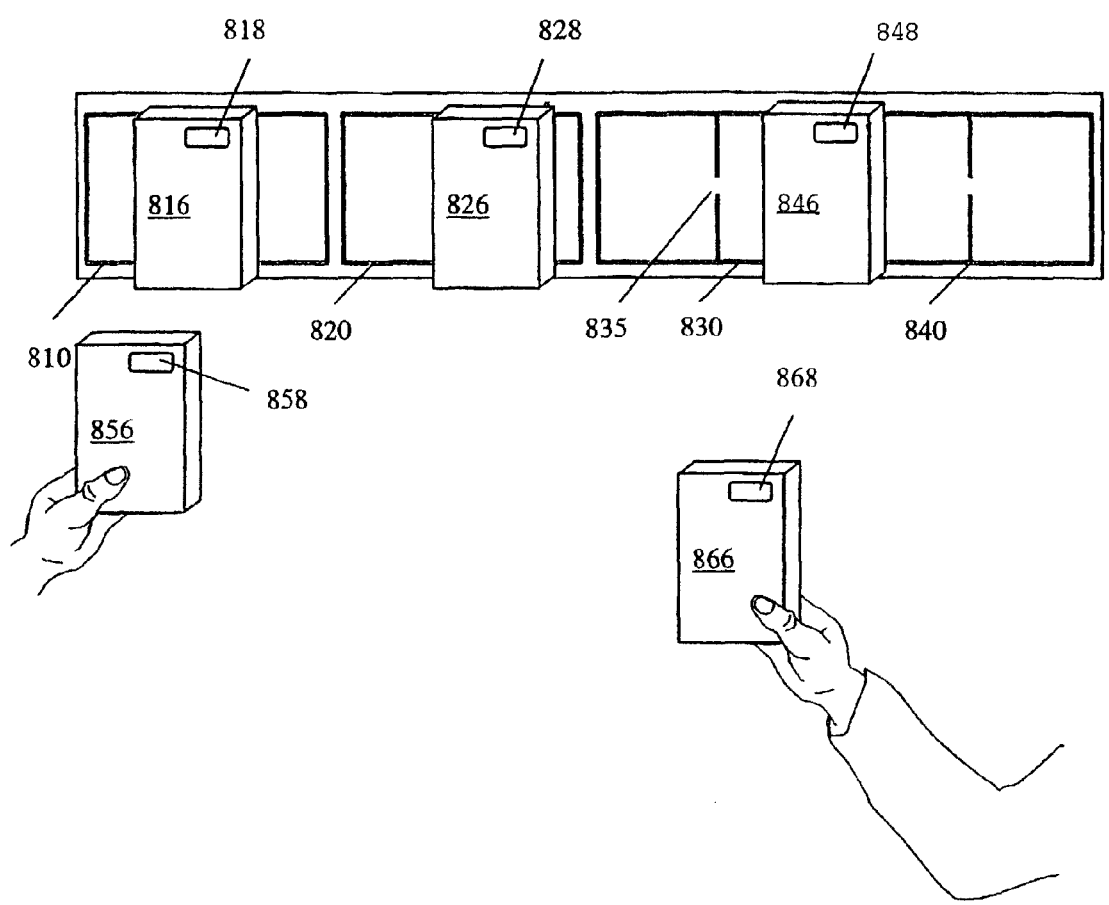
FIG. 8 illustrates a perspective view of backplane RFID reader antennae oriented for reading RFID tags in accordance with a preferred embodiment of the invention.

FIG. 8 shows tagged items 816, 826, and 846 such as DVD cases, each having an RFID tag such as 818, 828, and 848 respectively. The RFID tag is detected by one or more RFID reader antennae 810, 820, 830, 840 such as are disclosed in previous co pending applications. In FIG. 8, the antennae have a generally rectangular shape, and each has a feed point 835 (denoted only on antenna 830). The feed point 835 may be connected to circuitry such as tuning components, switching components, and an RFID reader (not shown here but described in previously referenced applications). The range on an RFID reader antenna such as 810 (e.g., the distance at which an RFID tag such as 818 can be read) can be determined by factors including the applied RF energy and the dimensions of the antenna. The range may be limited by regulations that limit the RF energy that can be detected at a distance away from the antenna. Where antennae are adjacent to one another, for example, antennae 810 and 820, the range may be adjusted by design so that even RFID tags located "between" the antennae (e.g., tags proximate to the border between antennae) will still be read. This means that there may be overlap between antennae, so that a given RFID tag may be read by more than one antenna, as a consequence of the effort to ensure that no tag is left unread.

The example shown in FIG. 8 depicts a possible "overlap" situation. A DVD 816 is centered on RFID reader antenna 810, and therefore RFID tag 818 may be read by antenna 810, but preferably not by antenna 820. DVD 826 is located to the side of RFID reader antenna 820, and therefore its RFID tag 828 may be read preferably by antenna 820. Ideally no other antenna would read tag 828, but tag 828 being also proximate to RFID reader antenna 830, may also be read by antenna 830. Such detection by antenna 830, however, may be sporadic. In a third case, DVD 836 with RFID tag 838 is located between RFID reader antennae 830 and 840. In order to detect RFID tag 838, at least one of RFID reader antennae 830 and 840 may preferably have a read range great enough to detect tag 838. Both antennae 830 and 840 may read tag 838, but it is possible that either antenna may not read the tag every time.

Other tags may be read intermittently, such as tag 858 attached to DVD 856 that is at the limit of detection of one or more antennae. Tag 858 may therefore be read occasionally, for example, from 20 to 80% of the time. Some tags may not be read at all, such as tag 868 attached to DVD 866 that is located beyond the read range of any of the antennae.

The structure of the merchandise may affect the read range. For example, a DVD box incorporating foil or metallic graphics (e.g., cover, insert, instruction book) may interfere with RF fields more than other DVD boxes. Therefore, the tags associated with items incorporating "interfering" packaging may be read less frequently than other tags (e.g., 30% of the time instead of 95% of the time). In other cases, the package displayed on a display module may only be the outer package, without the actual DVD inside (e.g., "boxed sets" that are too large to fit within security devices such as "safers" (hard plastic cases surrounding the DVD to prevent its being opened)). The box itself may be placed on the shelf, with an attached tag, but the DVD media are stored elsewhere and are given to the customer only upon purchase. Since the box contains no DVD media, it may interfere with RF fields less than the typical DVD package, and therefore it may be read at a greater distance than usual, or it may cause its associated RFID reader antenna to have a greater read distance so that it may read tags further away than usual (for example on adjacent antennae).

In another embodiment a computer or controller system for collecting information from tags may reduce or eliminate "double-counting" of tags due to overlapping detection areas. The computer or controller system can use any suitable algorithm or instruction code to identify the unique serial number and avoid double counting.

In another embodiment, the system can filter tag data to provide more efficient data reporting, data transmission, and data recording. In this example, the computer or controller system (e.g., as shown in FIG. 11) can provide data regarding the location of a particular item at a particular time by polling an RFID reader coupled to RFID antenna. The RFID system including RFID reader antennae such as depicted in FIG. 8 may be operated by a system including controllers and computers, as described in previous applications. Detection of tags by multiple antennas may introduce error into the exemplary detection system. A filtering system can be used to reduce error and provide more efficient data transfer and analysis.

While preferred embodiments of the invention have been described and illustrated, it should be apparent that many modifications to the embodiments and implementations of the invention can be made without departing from the spirit or scope of the invention. Although embodiments have been described in connection with the use of a DVD display structure, it should be readily apparent any structure that may be used in selling, marketing, promoting, displaying, presenting, providing, retaining, securing, storing, or otherwise supporting an item or product may be used in implementing embodiments of the invention. Although embodiments and implementations of the invention have been specifically illustrated herein as reading or detecting RFID tags placed on an item by detectors in the form of RFID reader antennae, the invention may easily be deployed or embodied in any form of (RF- or non-RF-based) tag using any known form of detectors (RF- or non-RF-based). Moreover, the specific components illustrated herein in the various embodiment, implementations and examples, may take any known form. The loop antennae of FIG. 8, for example, is typically used in the High Frequency range (e.g., 13.56 MHz), but the same techniques may be used with UHF systems or antennas (e.g., using slot antennas, patch antennas, etc.) or any other known system or antenna consistent with the teachings herein.

Although embodiments have been described in connection with the use of a shelf structure, it should be readily apparent any structure that may be used in selling, marketing, promoting, displaying, presenting, providing, retaining, securing, storing, or otherwise supporting an item or product may be used in implementing embodiments of the invention.

Although specific circuitry, components, or modules may be disclosed herein in connection with exemplary embodiments of the invention, it should be readily apparent that any other structural or functionally equivalent circuit(s), component(s) or module(s) may be utilized in implementing the various embodiments of the invention.

The modules described herein, particularly those illustrated or inherent in, or apparent from the instant disclosure, as physically separated components, may be omitted, combined or further separated into a variety of different components, sharing different resources as required for the particular implementation of the embodiments disclosed (or apparent from the teachings herein). The modules described herein, may where appropriate (e.g., reader 140, controller 1110, local database 1115, etc.) be one or more hardware, software, or hybrid components residing in (or distributed among) one or more local and/or remote computer or other processing systems. Although such modules may be shown or described herein as physically separated components, it should be readily apparent that the modules may be omitted, combined or further separated into a variety of different components, sharing different resources (including processing units, memory, clock devices, software routines, etc.) as required for the particular implementation of the embodiments disclosed (or apparent from the teachings herein). Indeed, even a single general purpose computer (or other processor-controlled device), executing a program stored on an article of manufacture (e.g., recording medium such as a CD-ROM, DVD-ROM, memory cartridge, etc.) to produce the functionality referred to herein may be utilized to implement the illustrated embodiments.

One skilled in the art would recognize that Location Assignment System 1100 could be implemented on a general purpose computer system connected to an electronic network 160, such as a computer network. The computer network can also be a public network, such as the Internet or Metropolitan Area Network (MAN), or other private network, such as a corporate Local Area Network (LAN) or Wide Area Network (WAN), Bluetooth, or even a virtual private network. A computer system includes a central processing unit (CPU) connected to a system memory. The system memory typically contains an operating system, a BIOS driver, and application programs. In addition, the computer system contains input devices such as a mouse and a keyboard, and output devices such as a printer and a display monitor. The processing devices described herein may be any device used to process information (e.g., microprocessor, discrete logic circuit, application specific integrated circuit (ASIC), programmable logic circuit, digital signal processor (DSP), MicroChip Technology Inc. PICmicro®. Microcontroller, Intel Microprocessor, etc.).

The computer system generally includes a communications interface, such as an Ethernet card, to communicate to the electronic network 160. Other computer systems may also be connected to the electronic network 160. One skilled in the art would recognize that the above system describes the typical components of a computer system connected to an electronic network. It should be appreciated that many other similar configurations are within the abilities of one skilled in the art and all of these configurations could be used with the methods and systems of the invention. Furthermore, it should be recognized that the computer and network systems (as well as any of their components) as disclosed herein can be programmed and configured as an inventory control processing unit to perform inventory control related functions that are well known to those skilled in the art.

In addition, one skilled in the art would recognize that the "computer" implemented invention described herein may include components that are not computers per se but also include devices such as Internet appliances and Programmable Logic Controllers (PLCs) that may be used to provide one or more of the functionalities discussed herein. Furthermore, while "electronic" networks are generically used to refer to the communications network connecting the processing sites of the invention, one skilled in the art would recognize that such networks could be implemented using optical or other equivalent technologies.

It is to be understood therefore that the invention is not limited to the particular embodiments disclosed (or apparent from the disclosure) herein, but only limited by the claims appended hereto.

TABLE 1A

| | 1st Col | 2nd Col | 3rd Col | 4th Col |
|---|---|---|---|---|
| 1st Row | a →ab | b →bc | c →cd | d |
| 2nd Row | e ↕ei | f | g | h |
| 3rd Row | i ↕im | j | k | l ↘kp |
| 4th Row | m ↕mq | n | o | p |
| 5th Row | q | r | s | t |

TABLE 1B

| Real Dimensions | | Real | Virtual Zones | | | |
|---|---|---|---|---|---|---|
| Rows r | Cols c | zones, r × c | horiz r(c − 1) | vert c(r − 1) | diag 2(r − 1)(c − 1) | total |
| 5 | 4 | 5 × 4 = 20 | 5(4 − 1) = 15 | 4(5 − 1) = 16 | 2(5 − 1)(4 − 1) = 24 | 55 |
| 5 | 20 | 100 | 95 | 80 | 152 | 302 |

TABLE 2

Assignment of location when
RFID tags are detected by more than one RFID reader antenna.
Example for one SKU (objects refer to FIG. 3A)
6 items with the SKU detected only on reader antenna 110
18 items with the SKU detected only on reader antenna 120
7 items with the SKU detected on reader antennae 110 AND 120
with an area of RF coverage overlap of reader antenna 110 and 120
defined as a virtual zone 342 (with periphery 342 or volume 344)
Stocking plan for the SKU is 20 units on reader antenna 110
and 30 units on reader antenna 120
This table gives examples of collectivized
locations based on the "collectivization principle"

| Collectivization Principle | Attributed to Reader Antenna 110 | Attributed to Reader Antenna 120 | Attributed to Virtual Zone 342 |
|---|---|---|---|
| Virtual read zone | 6 units | 18 units | 7 units |
| Antenna Winner take all | 0 units | 31 units | |
| Antenna Proportional | 8[6 + 7 * 6/ (6 + 18) = 7.75] | 23[18 + 7 * 18/ (6 + 18) = 23.25] | |
| Antenna plurality (50% majority) | 6 units | 25[18 + 7, since 18 is greater than 6] | |
| Antenna 2/3 Majority | Same as Antenna plurality since 18/(6 + 18) > 2/3 | Same as antenna plurality, since 18/(6 + 18) > 2/3 | |
| Antenna 80% Majority | Same as antenna proportional, since 18/(6 + 18) < 80% | Same as antenna proportional, since 18/(6 + 18) < 80% | |
| Stock Plan Winner take all | 0 units | 31 units | |
| Stock Plan Proportional | 9[6 + 7 * 20/ (20 + 30) = 8.8] | 22[18 + 7 * 30/ (20 + 30) = 22.2 | |
| Stock Plan Plurality (50% majority) | 6 units | 25 [18 + 7, since 30 is greater than 20] | |
| Stock Plan 2/3 Majority | Same as stock proportional since 30/(20 + 30) < 2/3 | Same as stock plurality, since 30/(20 + 30) < 2/3 | |

The invention claimed is:

1. A method of determining a location of an item, the method comprising the steps of:
designating first and second detection zones respectively associated with first and second detectors, wherein the first detection zone overlaps at least an area of second detection zone;
designating the overlap area as a virtual detection zone;
detecting the presence of an item in the virtual detection zone when the item is detected by both the first and second detectors;
assigning a first percentage of the item to the first detection zone; and
assigning a second percentage of the item to the second detection zone.

2. The method of claim 1, wherein said detecting steps detects the presence of an item in the virtual detection zone after the first detector detects the presence of the item at a first time and the second detector detects the presence of an item at a second time.

3. The method of claim 1, wherein said detecting steps detect the presence of an item in the virtual detection zone by both the first and second detectors at the same time.

4. The method of claim 1, further comprising adjusting a size of the virtual detection zone by changing power supplied to at least one of the first and second detectors.

5. The method of claim 4, wherein the first and second detectors are RFID read antennae and said adjusting step comprises increasing the size of the virtual detection zone by increasing the power of at least one of the first RFID antenna and the second RFID antenna.

6. The method of claim 4, wherein said adjusting step comprises of decreasing the size of the virtual detection zone by decreasing the power of at least one of the first RFID antenna and the second RFID antenna.

7. A method of determining a location of an item, the method comprising the steps of:
designating first and second detection zones respectively associated with first and second detectors, wherein the first detection zone overlaps at least an area of second detection zone;
designating the overlap area as a virtual detection zone;
detecting the presence of an item in the virtual detection zone when the item is detected by both the first and second detectors;
adjusting a size of the virtual detection zone by changing power supplied to at least one of the first and second detectors;
wherein said adjusting step further comprises reducing the power of the first detector until the item is not detected in the virtual zone; and resolving the location of the item wherein the item is assigned to the detection zone where it is detected.

8. The method of claim 1, further comprising associating the item with an RFID tag detectable by the first and second detectors.

9. The method of claim 8, further comprising assigning a unique identification number to the RFID tag selected from the group consisting of a manufacturer number, a stock keeping unit number, and a serial number.

10. The method of claim 9, further comprising:
reporting the detection of the item using the unique identification number when the item is detected by both the first and second detectors, wherein the reporting is performed only once.

11. A system for reading a plurality of items comprising RFID tags, the system comprising:
a plurality of RFID reader antennae capable of detecting the RFID tags; and
a plurality of RFID readers coupled to the plurality of RFID reader antennae for detecting items with a first RFID reader antenna and at least a second RFID reader antenna; and
a controller for identifying items detected by the first RFID reader antenna and at least a second RFID reader antenna and determining the location of the items;
wherein the location of the items is assigned according to the proportion of RFID tags detected by the first RFID reader antenna compared to the proportion of RFID tags detected by the second RFID reader antenna.

12. The system of claim 11, wherein the location of the items detected by both the first RFID reader antenna and the at least a second RFID reader antenna is determined to be in proximity to the first RFID reader antenna and the at least a second RFID reader antenna.

13. The system of claim 12, wherein the location of the items detected by both the first RFID reader antenna and the at least a second RFID antenna is determined to be in between the first RFID reader antenna and the at least a second RFID reader antenna.

14. A system for determining the location of a plurality of items comprising RFID tags, the system comprising:
a plurality of RFID reader antennae, each RFID antenna having a detection zone, wherein the detection zone of a first RFID antenna overlaps the detection zone of a second RFID antenna forming a virtual detection zone; and
at least one RFID reader coupled to the plurality of RFID reader antennae for detecting an item in the virtual detection zone when the presence of the item is detected by both the first and second RFID antennas, the at least one RFID reader for assigning a first percentage of the item to the first detection zone; and assigning a second percentage of the item to the second detection zone.

15. A system for reading items comprising RFID tags, the system comprising:
   a plurality of items each having an RFID tag and each RFID tag having a unique identification number;
   a plurality of RFID reader antennae for reading the RFID tags wherein the RFID reader antennae have a first detection zone and at least a second detection zone;
   at least one RFID reader for reading data from the RFID tags within the first detection zone and the at least a second detection zone; and
   a controller for activating the plurality of RFID reader antennae to read the RFID tags, determining the location of items, and storing the data in a local database;
   wherein the location of the items is in the first detection zone when said at least one RFID reader detects the item in at least the first predetermined number of read attempts out of a total number of read attempts.

16. The system of claim 15, wherein the location of the items is in the first detection zone or the at least a second detection zone.

17. The system of claim 15, wherein the first predetermined number of read attempts for which said at least one RFID reader determines that the item is in the first detection zone is 80% of the total number of read attempts made by said at least one RFID reader.

18. A method of determining a location of an item, the method comprising the steps of:
   designating first and second detection zones respectively associated with first and second detectors, wherein the first detection zone overlaps at least an area of second detection zone;
   designating the overlap area as a virtual detection zone;
   detecting the presence of an item in the virtual detection zone when the item is detected by both the first and second detectors;
   associating the item with an RFID tag detectable by the first and second detectors;
   assigning a unique identification number to the RFID tag selected from the group consisting of a manufacturer number, a stock keeping unit number, and a serial number;
   detecting the unique identification number during a first read cycle; and
   detecting the unique identification number during a second read cycle, wherein the detection of the unique identification number during the second read cycle is suppressed when the second read cycle is performed less than a predetermined number of read cycles from the first read cycle.

* * * * *